(12) United States Patent
Holt et al.

(10) Patent No.: US 7,639,741 B1
(45) Date of Patent: Dec. 29, 2009

(54) TEMPORAL FILTERING USING OBJECT MOTION ESTIMATION

(75) Inventors: Gary R. Holt, Bell Canyon, CA (US); Edward R. Ratner, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 794 days.

(21) Appl. No.: 10/729,834

(22) Filed: Dec. 5, 2003

Related U.S. Application Data

(60) Provisional application No. 60/431,384, filed on Dec. 6, 2002.

(51) Int. Cl.
*H04N 7/68* (2006.01)
*H04N 9/00* (2006.01)
*H04N 7/36* (2006.01)
*H04N 11/00* (2006.01)
*H04N 9/87* (2006.01)

(52) U.S. Cl. .......................... 375/240.08; 375/240.16; 375/240.27

(58) Field of Classification Search ............ 375/240.08, 375/240.16, 240.29, 240.09, 240.12
See application file for complete search history.

(56) References Cited

U.S. PATENT DOCUMENTS

| | | | | |
|---|---|---|---|---|
| 4,298,888 A | | 11/1981 | Colles et al. | |
| 5,070,413 A | * | 12/1991 | Sullivan et al. | 358/3.03 |
| 5,351,095 A | * | 9/1994 | Kerdranvat | 348/699 |
| 5,473,384 A | * | 12/1995 | Jayant et al. | 348/470 |
| 5,544,239 A | * | 8/1996 | Golin et al. | 382/236 |
| 5,568,196 A | * | 10/1996 | Hamada et al. | 348/416.1 |
| 5,585,862 A | * | 12/1996 | Wuertele et al. | 348/699 |
| 5,619,268 A | * | 4/1997 | Kobayashi et al. | 375/240.15 |
| 5,646,691 A | * | 7/1997 | Yokoyama | 348/416.1 |
| 5,650,823 A | * | 7/1997 | Ngai et al. | 375/240.15 |
| 5,912,991 A | * | 6/1999 | Jeon et al. | 382/242 |
| 5,982,909 A | * | 11/1999 | Erdem et al. | 382/103 |
| 6,064,776 A | * | 5/2000 | Kikuchi et al. | 382/260 |
| 6,178,205 B1 | | 1/2001 | Cheung et al. | |

(Continued)

FOREIGN PATENT DOCUMENTS

EP 596409 A2 * 5/1994

(Continued)

OTHER PUBLICATIONS

Kalivas, D. S. and Sawchuck, A. A. "Motion Compensated Enhancement of Noisy Image Sequences", Proceedings of the IEEE International Conference on Acoustics, Speech, and Signal Processing, Apr. 1990, pp. 2121-2124.*

(Continued)

*Primary Examiner*—Andy S Rao
*Assistant Examiner*—David N. Werner
(74) *Attorney, Agent, or Firm*—Okamoto & Benedicto LLP

(57) ABSTRACT

A method and apparatus for temporally filtering a video sequence using motion compensation in which motion information captures the motion of objects is disclosed. Pixels from a current frame are aligned with matching pixels from previous and/or future frames according to the motion of the surrounding object of arbitrary shape. A weighted average of the corresponding pixels is taken for each pixel in the current frame to produce a filtered version of the current frame. The weights may be adjusted to compensate for similarities between the frames and for blur transitions near object boundaries. A lighting offset may also be used to prevent erroneous lighting shifts during filtering.

9 Claims, 13 Drawing Sheets

Averaging Across Blur Transitions

U.S. PATENT DOCUMENTS

| | | | |
|---|---|---|---|
| 6,281,942 B1 | 8/2001 | Wang | |
| 6,343,097 B2 * | 1/2002 | Kobayashi et al. | 375/240 |
| 6,421,384 B1 * | 7/2002 | Chung et al. | 375/240.09 |
| 6,483,874 B1 * | 11/2002 | Panusopone et al. | 375/240.08 |
| 6,584,213 B2 | 6/2003 | Prakash et al. | |
| 6,600,786 B1 * | 7/2003 | Prakash et al. | 375/240.25 |
| 2001/0026586 A1 * | 10/2001 | Katata et al. | 375/240.1 |
| 2002/0106133 A1 * | 8/2002 | Edgar et al. | 382/261 |
| 2002/0114532 A1 | 8/2002 | Ratner et al. | |
| 2002/0131495 A1 * | 9/2002 | Prakash et al. | 375/240.08 |
| 2002/0141498 A1 * | 10/2002 | Martins et al. | 375/240.08 |
| 2003/0012277 A1 * | 1/2003 | Azuma et al. | 375/240.08 |

FOREIGN PATENT DOCUMENTS

| | | |
|---|---|---|
| EP | 1100260 A1 * | 5/2001 |
| JP | 62091090 A * | 4/1987 |
| WO | WO 9957906 A1 * | 11/1999 |
| WO | WO 00/64167 A1 | 10/2000 |
| WO | WO 00/77735 A1 | 12/2000 |

OTHER PUBLICATIONS

Kundu, A. and Wu, W. R. "Double-Window Hodges-Lehman (D) Filter and Hybrid D-Median Filter for Robust Image Smoothing", IEEE Transactions on Acoustics Speech, and Signal Processing, Aug. 1989, vol. 37, No. 8, pp. 1293-1298.*

Ozkan, M. K. et al. "Adaptive Motion-Compensated Filtering of Noisy Image Sequences", IEEE Transactions on Circuits and Systems for Video Technology, Aug. 1993, vol. 3, No. 4, pp. 277-290.*

Waggoner, B. _Compression for Digital Video_. Lawrence, KS: CMP Books, Aug. 2002. 273.*

Amazon.com listing for _Compression for Digital Video_. Sep. 2008.*

James C. Brailean, et al., "Noise Reduction Filters for Dynamic Image Sequences: A Review", Sep. 1995, pp. 1272-1292, vol. 83, No. 9, Proceedings of the IEEE.

* cited by examiner

Object-based Temporal Filtering

Boundary Blur Transitions

Segment boundary without blur

Segment boundary with blur

Averaging Across Blur Transitions

Frame n-1      Frame n

Exposed Area point: Do not predict from past

Frame n-1      Frame n

Point near exposed area: Decrease weight for previous frame

Averaging Near Differential Motion Boundary

GOP Boundaries

Calculate Motion Vectors Across GOP Boundary

TEMPORAL FILTERING USING OBJECT MOTION ESTIMATION

CROSS-REFERENCE TO RELATED APPLICATIONS

The present application claims the benefit of U.S. Provisional Application No. 60/431,384, entitled "Temporal Filtering Using Object Motion Estimation," filed Dec. 6, 2002, by Gary Holt and Edward R. Ratner, the disclosure of which is hereby incorporated by reference.

The present application is also related to the following:

U.S. patent application Ser. No. 09/550,705, filed Apr. 17, 2000 and entitled "Method and Apparatus for Efficient Video Processing," hereinafter 'Prakash I.' The disclosure of Prakash I has been published by the World Intellectual Property Organization under International Publication Number WO 00/64167 A1 with publication date Oct. 26, 2000.

U.S. patent application Ser. No. 09/591,438, filed Jun. 9, 2000 and entitled "Method and Apparatus for Digital Image Segmentation," hereinafter 'Prakash II.' The disclosure of Prakash II has been published by the World Intellectual Property Organization under International Publication Number WO 00/77735 A1 with publication date Dec. 21, 2000.

U.S. patent application Ser. No. 09/912,743, filed Jul. 23, 2001 and entitled "Motion Matching Method," hereinafter 'Prakash III.' Prakash III is now issued as U.S. Pat. No. 6,584,213 with issue date Jun. 24, 2003.

U.S. patent application Ser. No. 10/027,924, filed Dec. 19, 2001 and titled "Method and Apparatus for Deblurring and Reblurring Image Segments," hereinafter 'Ratner I.' Ratner I has been published by the U.S. Patent and Trademark Office under Publication No. US-2002-0114532-A1 with publication date Aug. 22, 2002.

The disclosures of each of the above documents are hereby incorporated by reference.

REFERENCES CITED

U.S. Pat. No. 6,178,205
U.S. Pat. No. 6,281,942
James C. Brailean, Richard P. Kleihorst, Serafin Efstratiadis, Aggelos K. Katsaggelos, and Reginald L. Lagendijk, "Noise Reduction Filters for Dynamic Image Sequences: A Review," *Proceedings of the IEEE*, Vol. 83, No. 9, September 1995, pp.1272-1292.

BACKGROUND OF THE INVENTION

1. Field of the Invention

The present invention relates generally to the processing of digital image sequences and specifically to temporal filtering of digital image sequences.

2. Description of the Background Art

Sequences of digital images often require filtering to remove noise or artifacts that can impair their visual quality. Examples of such sequences arise for instance in applications such as medical imaging, object tracking, pattern recognition, and video compression. Random noise that is introduced during the recording, storage, or transmission of images can degrade portions of the data and thus distort the visual presentation of an image sequence. Furthermore, at least in the case of video compression, other errors or noise in the data may be introduced in order to reduce the number of bits needed to represent the video sequence. Such errors may cause flicker, discontinuities, or other visual artifacts, adversely affecting display of the sequence.

Image filters seek to minimize the visual artifacts caused by such noise and other errors in image sequences by using correlations in surrounding data to attenuate or to remove the data errors. Such filters can operate in either the spatial domain or the temporal domain, or in some cases in both the spatial and temporal domains simultaneously. Spatial filters exploit spatial correlations within a single image to restore noisy data points to close approximations of the underlying source data. Temporal filters use correlations between different images that are temporally close to each other to accomplish the same goal. Spatio-temporal filters use correlations in both the spatial and temporal domains to replace noisy data with smoothed approximations. Some background on spatio-temporal and temporal filters can be found in the survey article "Noise Reduction Filters for Dynamic Image Sequences: A Review," by James C. Brailean et al and referenced above.

The present application is concerned primarily with temporal, rather than spatial, filtering. As discussed in the Brailean et al reference, a significant advance in temporal filtering concerns the use of motion compensation to properly align matching regions within different images in the presence of motion. For instance, when an object within a video scene moves over a short time span, that object will appear in different locations in consecutive video frames. Since the goal is to use the correlation between the image data in neighboring frames, identifying the pixels in one frame that correspond to a set of pixels in another frame improves the performance of a temporal filter. Yet accurately locating pixels in neighboring frames that correspond to the same object has been a difficult problem.

SUMMARY

It is therefore an object of the present invention to improve the performance of temporal filtering by taking into account actual object motion when performing motion compensation.

One embodiment of the invention pertains to a method for temporally filtering a video sequence using motion compensation. The motion of objects is estimated between frames in the video sequence. Pixels from a current frame are aligned with matching pixels from select preceding and/or future frames according to the estimated motion of a surrounding object. A filtered version of the current frame is produced by calculating a weighted average of the aligned pixels for each pixel in the current frame.

BRIEF DESCRIPTION OF THE DRAWINGS

A further understanding of the nature and advantages of the invention disclosed herein may be realized by reference to the remaining portions of the specification and the attached drawings.

To aid in understanding, identical reference numerals have been used wherever possible to designate identical elements in the figures.

DETAILED DESCRIPTION OF THE SPECIFIC EMBODIMENTS

1 Introduction and Overview

Figure 1:
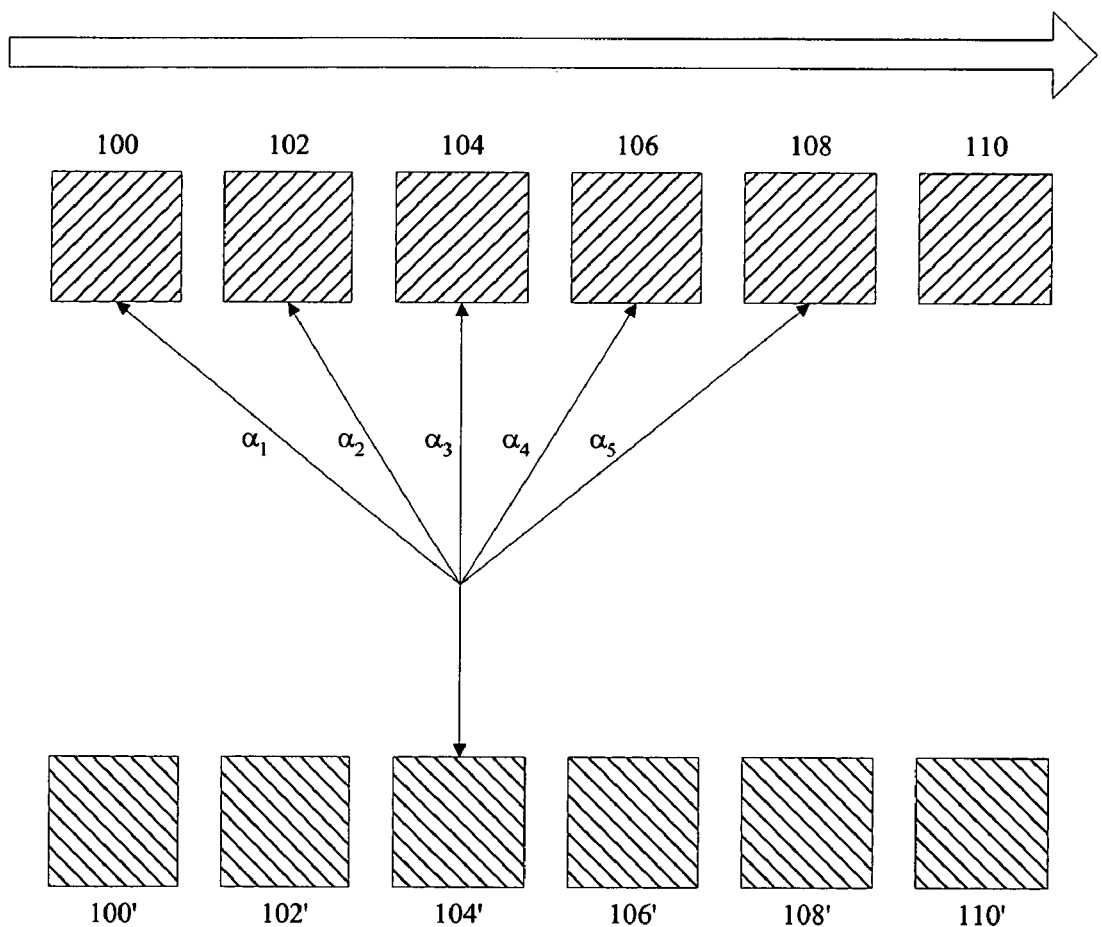
FIG. 1 is an illustration of the background art technique of replacing each frame with a weighted average of several consecutive frames.

The present invention relates to a process and apparatus for temporal filtering of video data. The filtering may be performed for instance in concert with video compression, either as a preprocessing step to further aid in compression efficiency, or as a post-processing step to remove noise and visual artifacts that result from compression or from other sources.

One aspect of the invention utilizes motion information for segments corresponding to actual objects to properly align corresponding pixels between different frames. Motion vectors provided by an object motion estimation procedure instruct the filter on how to match each pixel in the current frame with corresponding pixels in previous and/or subsequent frames, producing a true temporal flow of each pixel over time. Novel techniques are introduced to adapt the filter to preserve object boundaries and to account for the occlusion of objects and the appearance of new objects in a video sequence.

In accordance with a preferred embodiment of the invention, motion vectors describing the motion of arbitrarily shaped segments between frames are used to align pixels between past, current, and future frames. The color values for these corresponding pixels are averaged using weights that depend upon color differences between the frames. The weight for the past frame is set to zero for pixels belonging to 'exposed areas,' which are areas that have no counterpart in the past frame. Weights are diminished in blur regions near segment boundaries when the segments meeting at said boundaries have moved differentially or when the boundary touches an exposed area. Averaging is limited to frames within the current scene so that no averaging occurs across scene transitions. A lighting offset may be calculated to compensate for lighting changes for each segment between frames, and said lighting offset may be used to prevent inappropriate lighting shifts that may occur during the averaging of pixel color values. In the case of post-processing video that has been compressed and decompressed, additional motion estimation may be performed to allow motion-compensated filtering across GOP boundaries.

2 Problems with Previous Attempts

U.S. Pat. No. 6,178,205 to Sen-ching S. Cheung et al proposes a temporal filter followed by a spatial filter for video postprocessing. The temporal filter includes motion compensation, but it uses a block-based approach to finding motion vectors. For a given reference pixel, several motion vectors are used: the vector for the block containing the reference pixel and also vectors for neighboring blocks. These vectors are used to determine pixels in previous frames with which the reference pixel will be averaged. But block matching is known to produce at best coarse estimates of motion, so the resulting motion vectors are in general not accurate for a large number of pixels in the frame. Use of this filter can thus obscure details of the raw video by temporally averaging pixels that do not correspond to the same object location.

U.S. Pat. No. 6,281,942 to Albert S. Wang proposes an adaptive spatial filter followed by an adaptive temporal filter. Block-based motion compensation is once again used to align pixels between adjacent frames. In blocks that are poorly matched, no temporal filtering is done, while in blocks with good or excellent matches moderate or heavy temporal filtering is performed. This approach seeks to exploit the advantages of temporal filtering in regions of the frame for which motion compensation is successful while avoiding erroneous filtering for regions that do not match well between adjacent frames. However, its dependence upon block matching again limits its effectiveness since accurate motion estimation is not likely. Furthermore, in both of these previous attempts the blocks used in matching are unlikely to match the boundaries of objects well, so object boundaries are likely to be obscured or blurred as a result of the filtering.

3 Detailed Description of the Drawings

3.1 Temporal Filtering Introduction

The basic idea of existing methods for temporally filtering video data involves averaging the data for two or more consecutive frames and using the result as the filtered replacement for a given frame. For instance, FIG. 1 shows a sequence of input video frames 100, 102, 104, 106, 108, 110, etc. A new sequence of filtered frames is labeled 100', 102', 104', 106', 108', 110', etc. Each filtered frame is created by taking a weighted average of the several frames in the input sequence that surround that temporal location. For instance, filtered frame 104' is shown to depend on input frames 100, 102, 104, 106, and 108. The parameters $\alpha_1$, $\alpha_2$, $\alpha_3$, $\alpha_4$, and $\alpha_5$ are the weights used when computing a weighted average of these input frames. The weighted average might for instance be computed on a pixel by pixel basis, where a given pixel location in 104' is given a color value resulting from taking the color values of pixels in the same location in frames 100, 102, 104, 106, and 108, and averaging them with the above weights. Typically each filtered frame of the filtered video sequence is created in analogous fashion.

As mentioned in the section "Description of the Background Art," the above method does not work very well when motion occurs during the video sequence. As objects move around within the frame, the color of a given pixel location will clearly change from time to time. When different objects appear in a given pixel location during the course of several consecutive frames, averaging the color values at that pixel location for the several frames will result in a muddled color that does not correspond to original content of the video sequence. However, if portions of the several consecutive frames that correspond to the same object or part of an object are used to calculate a temporal color average, then the averaged color is more likely to accurately represent the content of the video while suppressing noise or fluctuations that might appear in individual frames.

Figure 2:
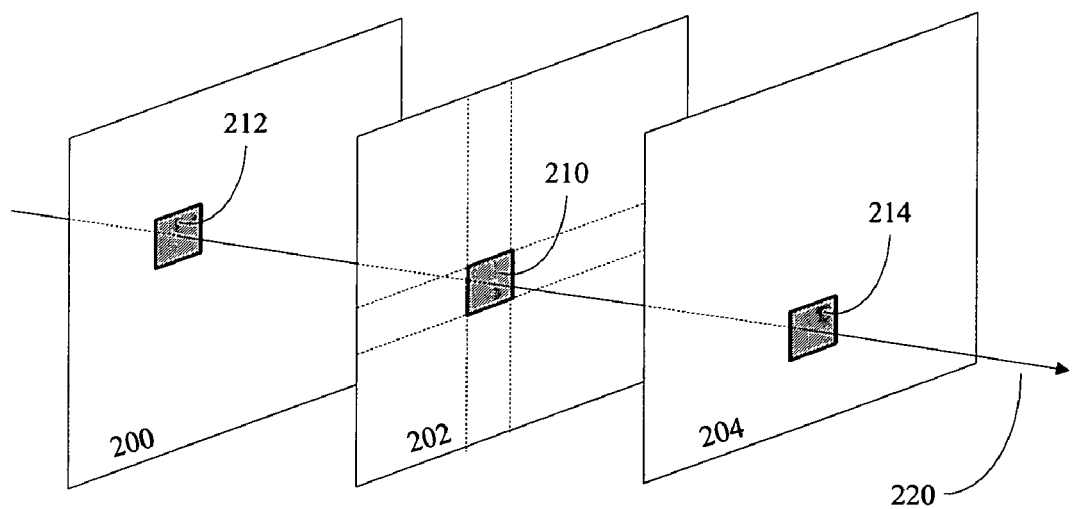
FIG. 2 is an illustration of motion compensated temporal filtering using block-based motion compensation.

For this reason, motion compensation strategies are often used to match a pixel location in the current frame with locations in nearby frames that likely correspond to the same object. Most motion compensation schemes divide each frame into a regular grid of square blocks and search for the block in previous or following frames that provide the closest color match for each block in the current frame. Then each block in the current frame can be linked with previous and following blocks to provide a coarse approximation of the flow of objects over time. For instance, in FIG. 2, a single block is traced through three consecutive video frames 200, 202, and 204. Block 210 in frame 202 is matched using some block matching algorithm with the nearest match block 212 in frame 200 and with nearest match block 214 in frame 204. Arrow 220 gives an idea of the spatio-temporal flow of the data in this block within the video sequence.

One major problem with this approach stems from the fact that most objects in video sequences are not well described by regular, square blocks. Some blocks will often include portions of two or more objects, and these objects may not appear in the same relative positions at different moments in the input sequence. Thus, in a block-based motion compensation strategy, some pixels will inevitably be matched with pixels in other frames that do not belong to part of the same object. Furthermore, since object boundaries generically do not lie along a regular square grid, the block-based approach is particularly bad at preserving clear boundaries between distinct objects. In order to temporally filter color data using only information that is relevant to each pixel, it becomes necessary to find more accurate matches for each pixel location and each object across several frames.

A further problem with motion compensation by block matching arises when several reference frames are used to provide the best match for a block. It is common in block-based motion compensation to search for the best matching block among several previous frames in order to produce adequate matches. For instance, one block in frame n may be matched with a block from frame n−3 while another block in frame n is matched with a block from frame n−1. This temporal inconsistency makes it difficult to establish a coherent motion field expressing the flow of each pixel over time.

Figure 3:
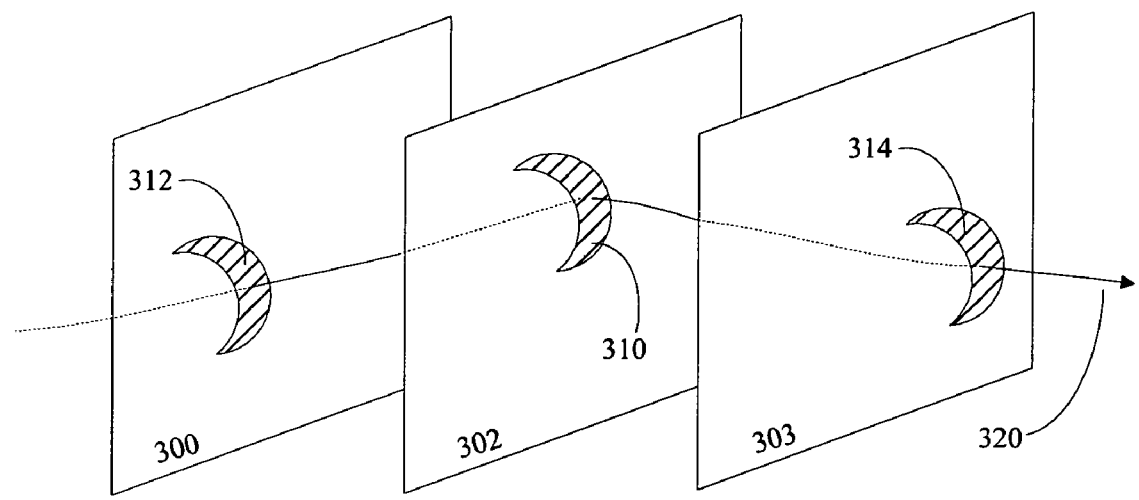
FIG. 3 is an illustration of temporal filtering using object-based motion compensation.

FIG. 3 illustrates the spatio-temporal flow of an actual visual object within a video sequence comprised of frames 300, 302, and 303. A crescent-shaped object 310 in frame 302 occupies position 312 in frame 300 and position 314 in frame 304. Arrow 320 shows the flow of this object over time. A superior temporal filter will match the pixels contained in this object to their proper counterparts in adjacent frames before averaging the color values. In this way, a smoothed image of the crescent will appear in the filtered frame, untainted by extraneous data from other objects.

The present invention uses segment-based object motion estimation to determine the displacement of actual objects between frames, as in FIG. 3. Any suitable method for dividing a frame into semantic objects or segments may be used. In one embodiment, the method disclosed in Prakash II referenced herein is used.

A motion estimation step is used to provide motion vectors for each segment comprising the frame of interest. Motion estimation may be performed in either the forward or reverse direction. Object motion estimation may be carried out according to the process outlined in Prakash I, referenced herein. Any of a variety of segment matching methods may be used, included the technique disclosed in Prakash IIi, also referenced herein.

In one embodiment, the process of temporal filtering is carried out as a post-processing step after decoding a compressed video sequence. In this embodiment, a decoder has access to reconstructed frames, segmentation information about reconstructed frames, and motion vectors used to reconstruct certain frames using segments from one or more reference frames. For instance, the decoder may access segment information and motion vectors according to the video encoding and decoding technique described in the aforementioned patent application Prakash I. In this embodiment, the existing segmentation information and motion vectors provide the necessary means to track the flow of objects over time and thus to temporally filter each pixel using only information belonging to the relevant surrounding object.

In one embodiment, the decoder reconstructs a predicted frame using segments from one or more reference frames and motion vectors describing where to place each segment in the predicted frame. When applying the temporal filter to the predicted frame, the goal is to have a complete motion field that ascribes a motion vector to each pixel in the frame pointing to a corresponding (motion-adjusted) pixel location in a reference frame. The majority of the pixels in the predicted frame typically belong to areas that were covered by displaced segments from a reference frame, so the corresponding motion vector used to displace the covering segment is used for each of these pixels. Some pixels in the predicted frame may have been left uncovered by displaced segments because of segment overlaps or the introduction of new content into the field of view. Such pixels make up "exposed areas." These exposed areas often do not correspond to any objects occurring in a reference frame, so no pixels in that reference frame are used to temporally filter the exposed areas. These pixels in exposed areas are labeled as having no motion vector for that reference frame.

In one embodiment, additional effort is made to filter pixels in exposed areas using pixels from a reference frame. In case all the segments bordering the exposed area moved coherently, it is likely that the exposed area moved in the same way but for some reason the motion estimation step failed to capture that fact. If the coherent motion vectors of the neighbors are sufficiently small in magnitude, then it is assumed that the pixels in the exposed area moved in the same way. An average of the motion vectors of the neighboring segments is used to associate pixels in the exposed area to pixels in the reference frame in this case. However, if the neighboring segments moved more than some threshold or if they did not move coherently, then as before the pixels in the exposed area are not associated to the any pixels in the reference frame and the support of the temporal filter is clipped for these pixels.

In one embodiment, motion information comprises more than translational motion vectors. For instance, all or a portion of the reference frame may be transformed using a linear transformation or any other deformation in addition to translation of segments by their respective motion vectors. In this case, the motion vectors ascribed to each pixel in the predicted frame should be adjusted to agree with whatever transformation and/or translation has occurred to reconstruct the predicted frame from the reference frame. For instance, an affine model may be used to transform the reference frame via a linear transformation (i.e. matrix multiplication) and then to displace the resulting segments by their individual motion vectors. In this case, a pixel location $x'=(x',y')$ in the predicted frame is predicted using the linear model $x'=A\ x+v$, where x is the corresponding pixel in the reference frame, A is a linear transformation, and v is a translational motion vector for the segment containing pixel x. In this embodiment, the affine model is used to describe the correspondence between each pixel in a predicted frame and its corresponding pixel in a reference frame. One skilled in the relevant art will recognize that transformation A need not be linear; nonlinear transformations are also contemplated by the present invention.

The temporal filter may be applied with support involving the current frame and previous frame(s), the current frame and subsequent frame(s), or the current frame and both previous and subsequent frame(s). In the preferred embodiment, the current frame and both previous and subsequent frames are used. A video sequence will typically consist of 'I-frames' that are encoded independently of other frames, 'P-frames' that are predicted from an I-frame or from another P-frame, and 'B frames' that are predicted bidirectionally from the nearest P- or I-frames. In the preferred embodiment, B-frames are predicted using the nearest P- or I-frames on both sides, and P-frames are predicted using the nearest P- or I-frames on both sides. Note that for P-frames these nearest P- or I-frames used by the filter may not be immediately adjacent to the current P-frame.

In one embodiment, motion vectors indicate the displacement of each segment in the previous frame that will result in the best match in the current frame. These vectors are used to determine which pixels should be matched and averaged by the temporal filter. To extend the support of the filter to include the next future frame as well, the motion vectors found between the previous frame and the current frame are used to approximate segment displacements between the current frame and the next future frame. This estimate is justified because at the very small time scale of two or three consecutive frames from a video sequence with 30 or more frames per second, motion is very likely to continue in the same direction and speed. These approximate motion vectors between the current frame and the next future frame are used to match pixels from the current frame with pixels from the next future frame, thereby extending the support of the temporal filter.

Figure 4:
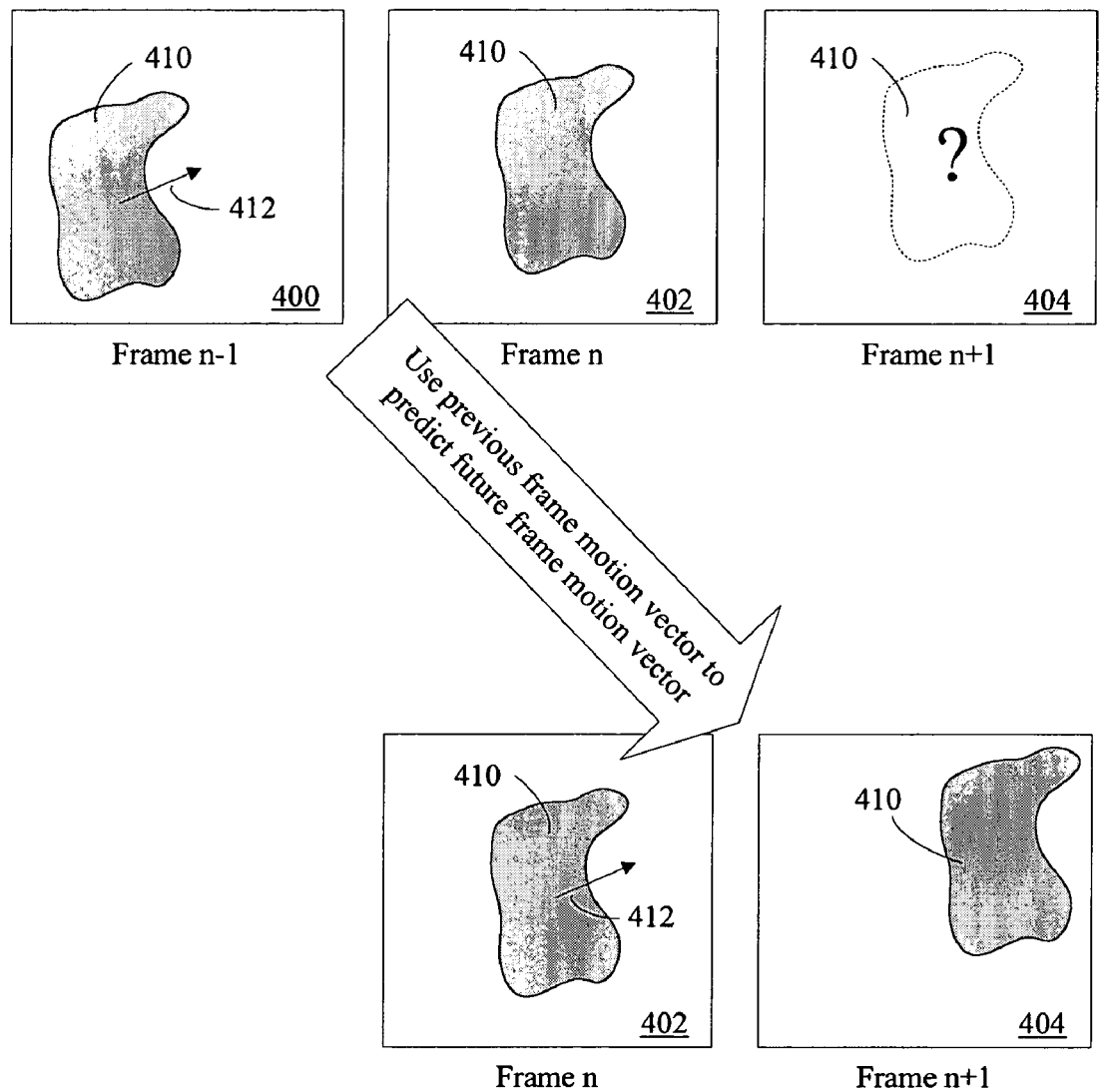
FIG. 4 is an illustration showing the use of motion vectors from a previous frame to predict future motion vectors for objects.

FIG. 4 illustrates using motion vectors from a previous frame to predict motion vectors for a future frame. Frames 400, 402, and 404 occur consecutively in a video sequence. Segment 410 appears in frame 400 and it appears in the later frames but in perhaps a different position. Motion vector 412, shown in frame 400, indicates the displacement between the position of segment 410 in frame 400 and frame 402. The position of segment 410 in frame 404 may be unknown, for instance because motion information between frames 402 and 404 is not accessible to the temporal filter at the time. Nonetheless, it is desirable to use frame 404 in the support of the temporal filter. Motion vector 412 is applied to the current frame 402 to estimate the position of segment 410 in the next frame, frame 404. This estimate provides an efficient way of using limited motion information for a current frame to align pixels from the previous, current, and next future frames so that the temporal filter can average them.

In one embodiment, the temporal filter takes the previous, current, and next future frames as input and for each pixel in the current frame, it outputs an averaged pixel value based on the current pixel value and the values of the corresponding matched pixels in the previous and next frames. The filter may operate on each of three color components separately for each pixel or it may operate on all color components simultaneously.

The weights that the filter uses to average the corresponding pixel color values may depend on various characteristics, such as for instance a measure of the color difference between the pixels. In one embodiment, the filter outputs each of three color components for each pixel in the current frame. For instance, if the well-known Y, U, and V color components are used, then for a given pixel location in the current frame the temporal filter will output a new Y, U, and V value. Any other color components, such as for instance R, G, and B for red, green, and blue, may alternatively be used.

Taking the Y component as an example, in one embodiment the temporal filter returns the value $$y' = \frac{w_p y_p + y_c + w_f y_f}{w_p + 1 + w_f},$$

where $w_p$ and $w_f$ are weights given to the previous and future frames respectively, the current frame is given a weight of 1, $y_p$, $y_c$, and $y_f$ are the Y-values of the corresponding pixels in the previous, current, and future frames, and the division by $w_p + 1 + w_f$ is done to normalize the weights to sum to 1. Analogous formulas are used for the U and V values.

In one embodiment the weights $w_p$ are assigned according to the formula:

$$w_p = e^{-[\sum (y_p - y_c)^2 + (u_p - u_c)^2 + (v_p - v_c)^2]/2\sigma^2},$$

where y*, u*, and v* are the Y, U, and V color values for the frame designated by the subscript and where σ is a normalizing constant. Preferably the sum is taken over several pixels in a neighborhood of the current pixel so that small local noise does not reduce the weights but larger regional dissimilarities do cause the weights to be diminished. The weights $w_f$ are assigned analogously.

In one embodiment, when a scene change is detected between the current and the next frame, the future weights are instead set to zero for each pixel when filtering the current frame, and the past weights are set to zero when filtering the next frame across the scene boundary. Also, the weight for the previous frame is set to zero for pixels belonging to exposed areas since these pixels have no match in the previous frame. Additional motion information may be used to determine the best match between the current and future frames for pixels belonging to exposed areas, since no information from the previous frame is available.

3.2 Boundary Blur Transitions

An object-based motion compensation strategy for temporal filtering can encounter difficulties near the boundaries between objects that are moving because the boundaries of those objects are not always clearly demarcated. It is especially common for the individual images from a video sequence to exhibit some color blur across the boundaries between objects. Such color blur may occur because of coarse resolution, camera focus or exposure, spatial filtering, or other reasons. Thus, when pixels are separated into groups belonging to one segment or another, there are likely to be some pixels near the boundary between two segments that contain some color from the opposing segment. More detail about blur transitions may be found in Ratner I, referenced herein.

Figure 5A:
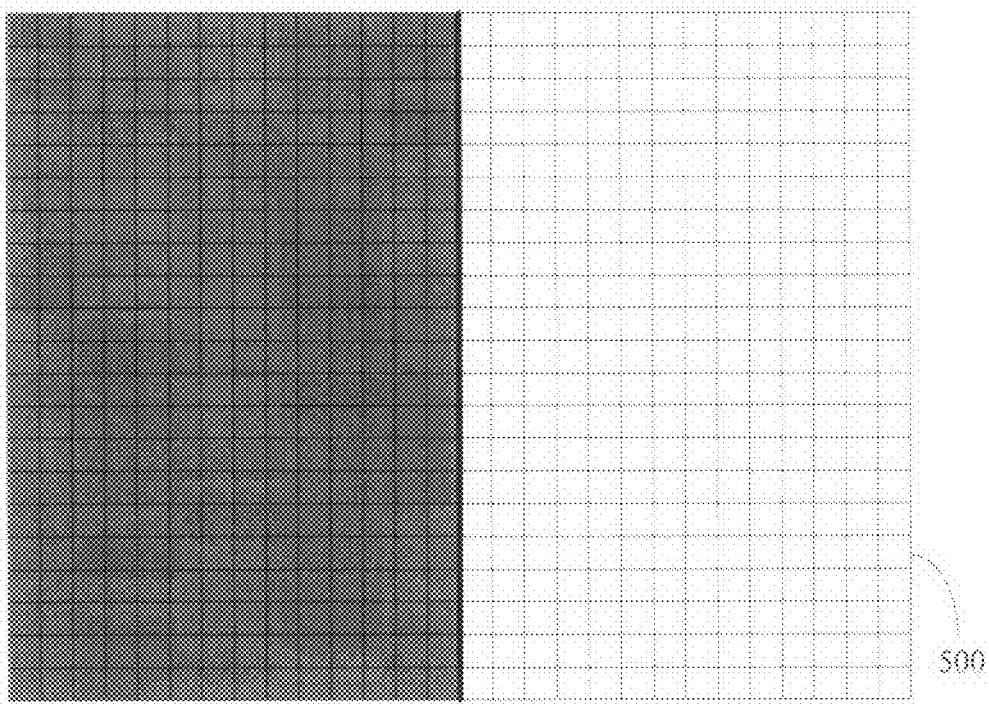
FIG. 5*a* is an illustration of the presence of color blur across object boundaries.
Figure 5A:
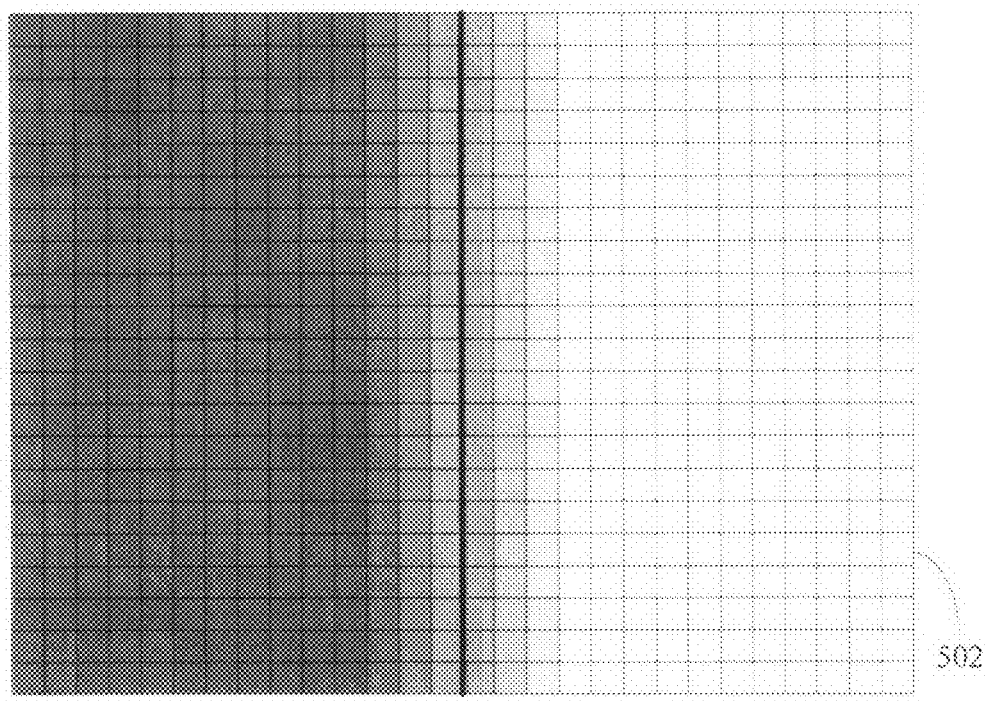

FIG. 5a shows an enlarged example of color blur across a segment boundary. The first rectangular area 500 shows two segments, one gray and one white, meeting at a clearly defined vertical boundary. The second rectangular area 502 shows two similar segments meeting along a vertical boundary, but this time the color values near the boundary are blurred. The gray segment gets somewhat lighter in color within a few pixels of the boundary, and the white segment gets someone darker near the boundary, so that the color transitions gradually from gray to white over a width of several pixels.

Figure 5B:
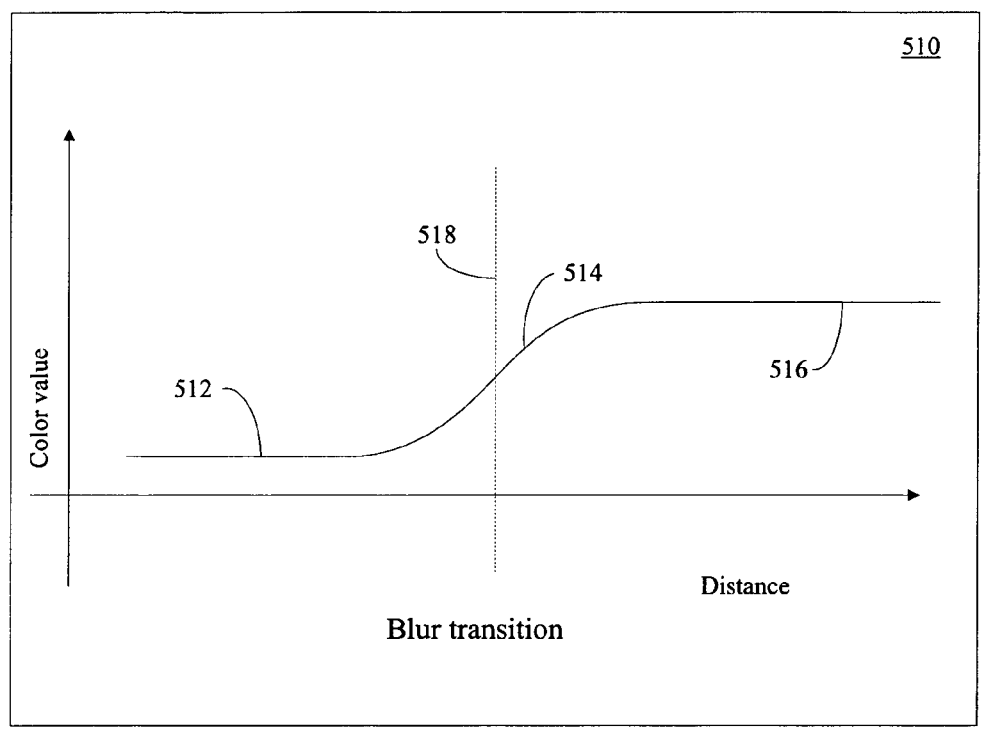
FIG. 5b is a graph of color versus distance indicating the gradual color transition representative of blurred object boundaries.

FIG. 5b contains a graph 510 of color value versus distance that shows the gradual transition from one color to another across a segment boundary. Line portion 512 indicates the color value of a first segment. Curved line portion 514 shows the gradual color transition or blur between the first segment and a second segment. Line portion 516 indicates the different color value of the second segment. Vertical line segment 518 indicates the boundary between the two segments, which in this case is taken to lie in the middle of the blur region.

The problem arises when neighboring objects move differently between frames. A given segment may move so that a portion of its boundary is no longer adjacent to the same segment as in the previous frame. That boundary portion may be adjacent to a region of a different color, so that the blur at that boundary portion may contain some color from the new region rather than some color from the previously adjacent segment. If the temporal filter averages color values of pixels within the blur region in the previous and current frames, some color from the previously adjacent segment may be introduced to the new segment location where it does not belong. This trailing color can create a visible artifact at the boundary of the moving segment.

Figure 6:
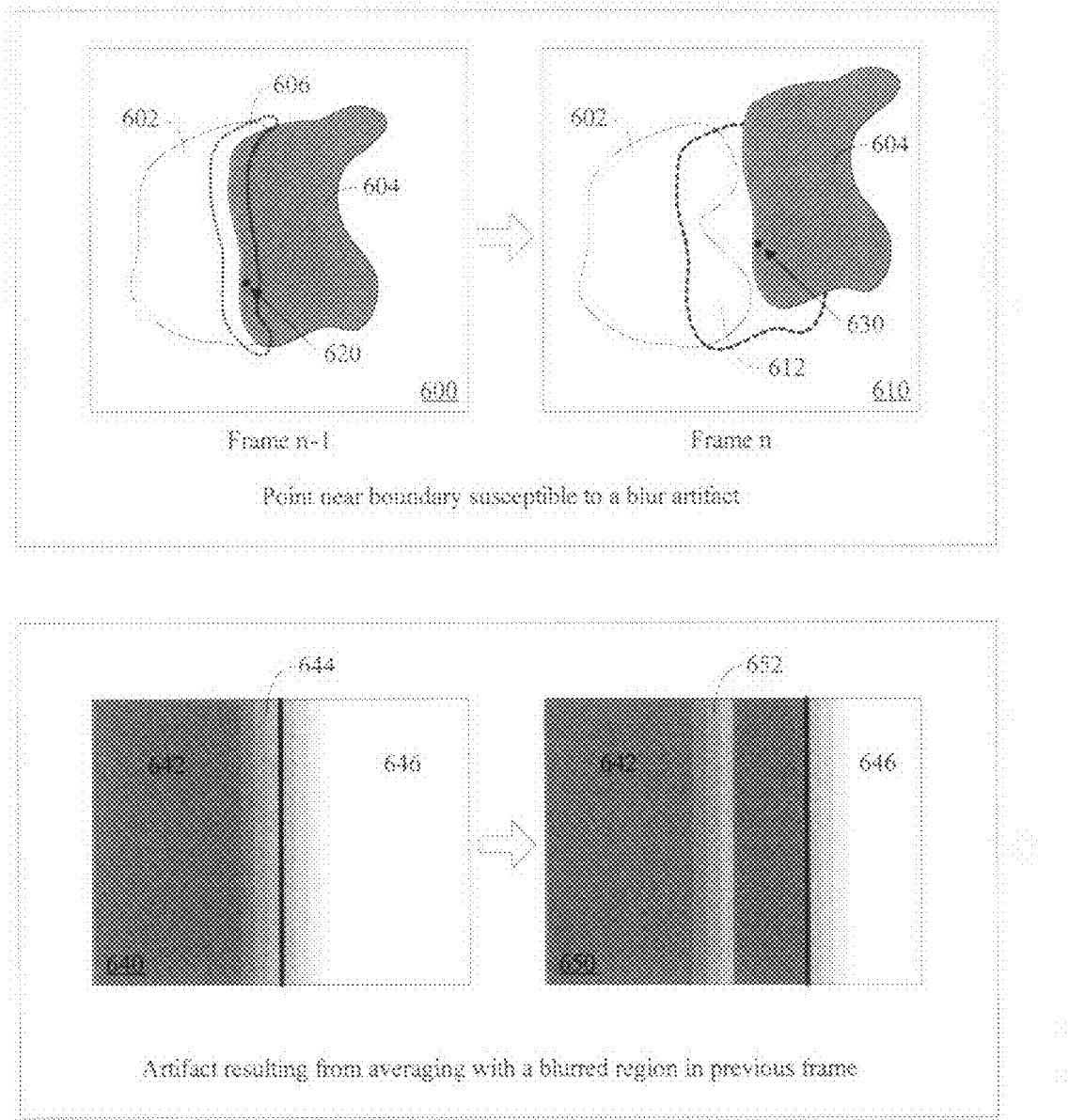
FIG. 6 is an illustration of an artifact resulting from improperly weighted averaging of pixels in a blur region near an object boundary.

FIG. 6 illustrates a trailing color artifact that can result from improper averaging in over blur regions. Frames 600 and 610 are two consecutive frames from a video sequence. The two segments 602 and 604 appearing in frame 600 move apart to reveal an exposed area 612 lying between them in frame 610. Region 606 represents the area near the boundary between segments 602 and 604 in frame 600 that likely contains a blur transition. Pixel 620 in frame 600 lies in segment 604 but is very close to the boundary. Pixel 620 corresponds to pixel 630 in frame 610, which lies in the same position relative to segment 604. Since pixel 620 lies within the blur transition region 606, caution should be used in filtering the matching pixels 620 and 630 from the two frames to avoid introducing blur from segment 602 into segment 604 in frame 610, where segment 602 is no longer adjacent to pixel 630 in segment 604.

Rectangles 640 and 650 are close-up views of a segment boundary with blur in two consecutive frames after naïve temporal filtering. Area 642 is a portion of a gray segment and area 646 is a portion of a white segment. In frame 640, a blur region 644 separates the two segments. In frame 650, frame 646 has moved to the right, revealing an exposed area that is the same color as segment 642. The blur within segment 646 is correct because the color across the boundary from this segment is the same color as in frame 640. However, a blur band 652 appears in the middle of the gray area composed of segment 642 and the new exposed area. No blur should appear in the middle of the gray area in this case because it is a consistent background that is being revealed as the white segment moves to the right. Because the pixels in band 652 correspond to pixels near the boundary of segment 642 in frame 640, a naïve temporal filter averages them together creating this blur artifact in the middle of a smooth area. Such artifacts are especially visible to the human visual system when they appear in smooth areas or areas with little color variation.

Figure 7:
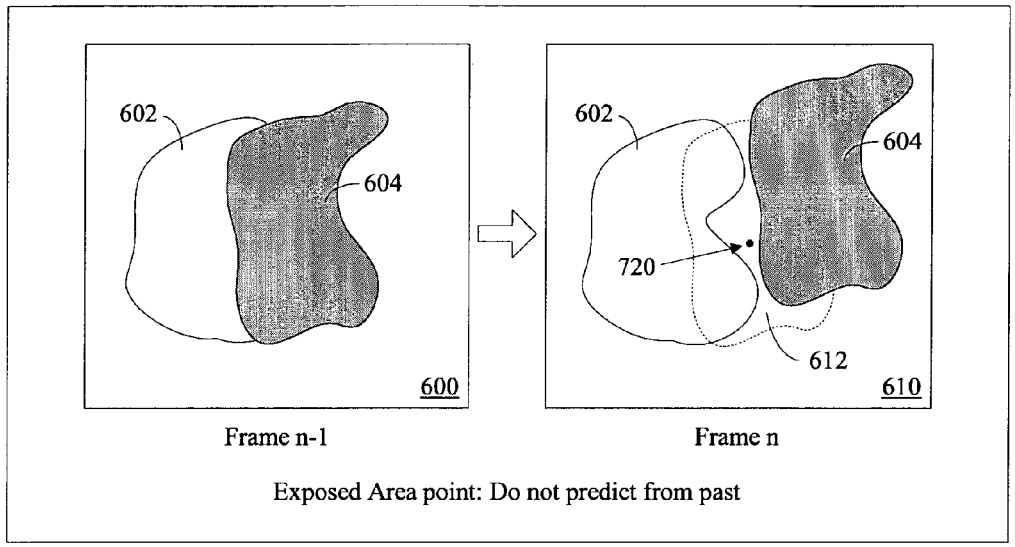
FIG. 7 is an illustration describing how to weight the previous frame in a temporal filter near a boundary with an exposed area.
Figure 7:
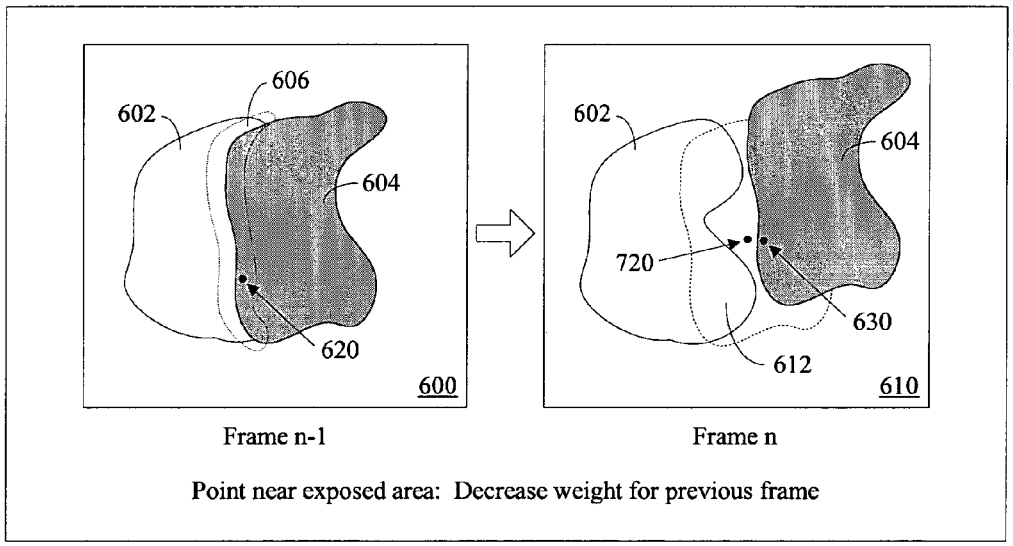

The present invention provides a technique for diminishing the weights used by the temporal filter for such blur regions to eliminate the blur trail artifact described above (or other artifacts that appear near segment boundaries). FIG. 7 illustrates two cases where the weights used by the temporal filter are altered. In the first case, two segments 602 and 604 move apart between frame 600 and frame 610. Pixel 720 lies in exposed area 612 in the later frame 610. Because this pixel does not correspond to any pixel in frame 600, no information from frame 600 should be used to average pixel 720. Alternatively, the weight for the previous frame is set to zero for pixel 720.

In the second case, pixel 630 lies within segment 604 in frame 610, but pixel 630 is very close to the boundary and thus very close to pixel 720. Since segment 604 has a match in the earlier frame 600, pixel 630 does correspond to pixel 620 in frame 600. Note that pixel 620 lies inside blur transition region 606. Thus, pixel 620 is likely to contain some color from segment 602. But pixel 630 in the later frame 610 is no longer immediately adjacent to segment 602 because an exposed area has opened between the segments. Thus, the color just across the boundary from pixel 630 may not be the same as the color of segment 602. If pixel 630 is averaged with pixel 620, then some color from segment 602 will be introduced near the boundary of segment 604 in frame 610, where it does not belong. Thus, the weight for pixel 620 is reduced to minimize this effect. In one embodiment, the weight is reduced more for pixels very close to the boundary, and less so for pixels further from the boundary.

Figure 8:
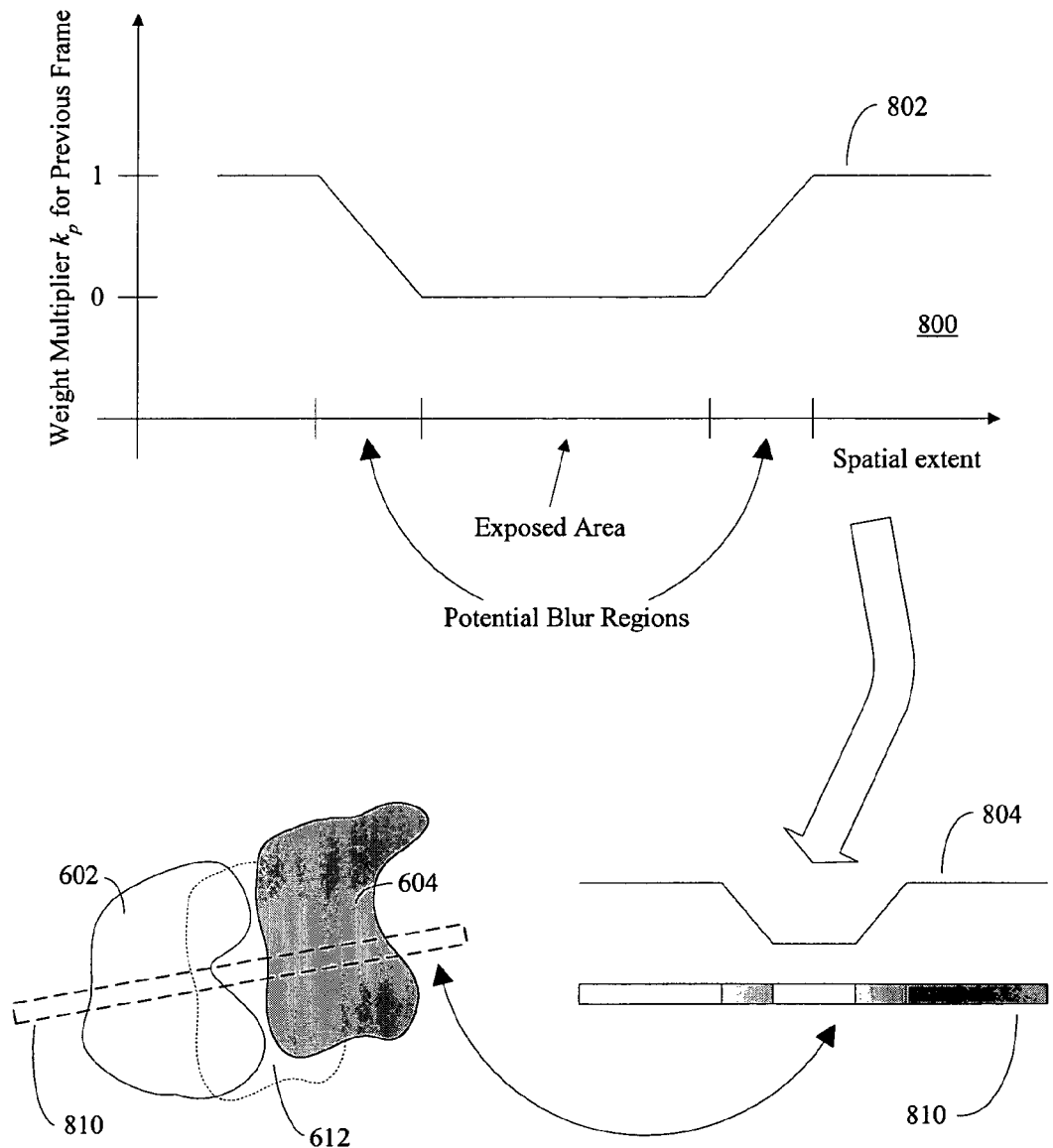
FIG. 8 is an illustration containing a graph explaining how to adjust averaging weights for exposed areas and blur regions.

FIG. 8 illustrates the diminution of weights in blur regions that are adjacent to exposed areas (as in the example discussed above with reference to FIG. 7). Graph 800 shows an example of how a weight multiplier $k_p$ can be used to gradually reduce the total weight $k_p w_p$ used for the previous frame in a blur region near an exposed area. Curve 802 shows a linear reduction of the weight multiplier from 1 down to 0 over blur regions, with the multiplier constant at 0 over exposed areas and constant at 1 for the parts of segments not in the blur region. Note that the weights need not be reduced linearly, and one skilled in the relevant art can readily conceive of various other means for diminishing the weights in blur regions that are consistent with the present invention.

Band 810 is a linear cross section cutting through segment 602, exposed area 612, and segment 604. The one-dimensional graph 800 of weight multiplier versus spatial extent can be applied for instance across the cross sectional band 810. Note that the weight multipliers are determined relative to the current position of segments but are applied to the data from the previous frame, in which segments 602 and 604 occupy different positions. From left to right, band 810 shows a white region corresponding to segment 602, a first blur region corresponding to the area near the boundary of segment 602 in an earlier frame, a white region corresponding to exposed area 612, a second blur region corresponding to the area near the boundary of segment 604 in an earlier frame, and a gray region corresponding to segment 604. Curve 804 indicates how the weights from graph 800 above can be applied to these different regions in band 810.

Figure 9:
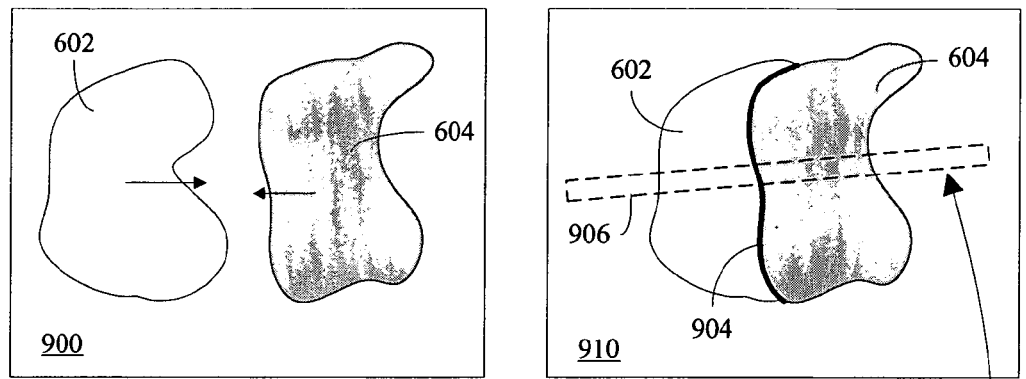
FIG. 9 is an illustration explaining how to adjust averaging weights near differential motion boundaries.
Figure 9:
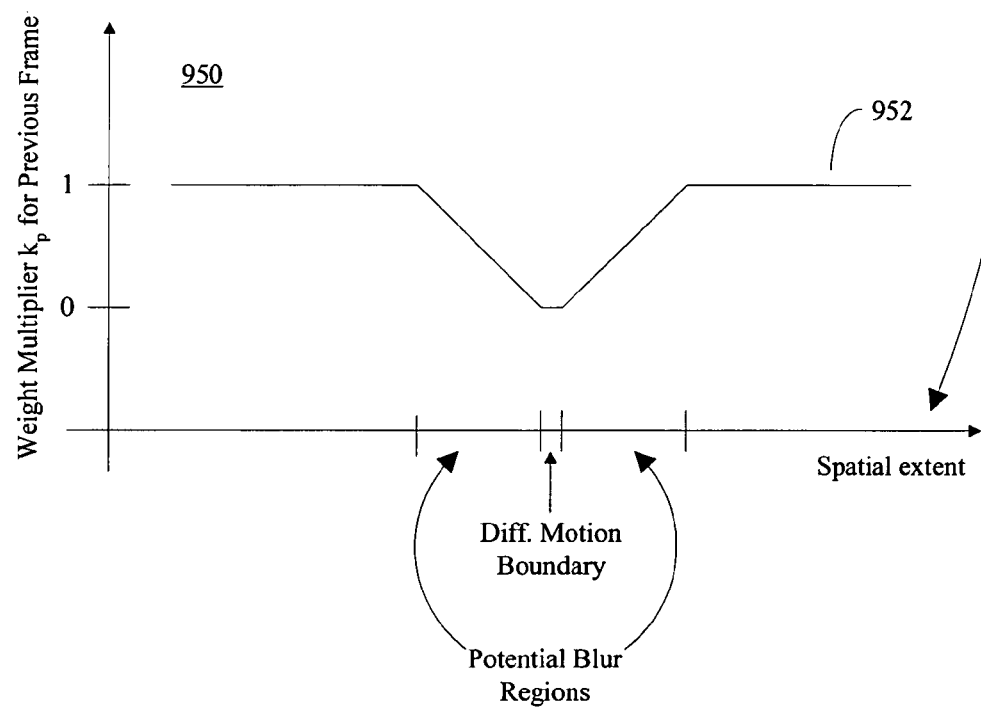

The problem of blur artifacts does not only arise around the border of exposed areas. The color across the boundary of a segment can also change between two frames when two segments move in substantially different directions (differential motion). For instance, two segments that are not adjacent can converge so that in the next frame they are adjacent. FIG. 9 illustrates such convergence of segments and the weighting adjustment used for their respective blur regions. In frames 900 and 910, segments 602 and 604 are depicted as moving together. The two segments do not touch in frame 900, but segment 604 overlaps segment 602 in frame 910. Since each of the two segments has a new neighbor across its boundary 904 in frame 910, the blur contained near the corresponding boundaries in frame 900 may not match the colors near boundary 904. Thus, a weight multiplier is again used to set the weight for the previous frame to zero on the segment boundary 904 and to reduce the previous frame's weight in the relevant blur regions. Band 906 is a cross-section of the two overlapping segments in frame 902. Graph 950 illustrates a linear reduction of the weights for the previous frame across the blur regions that can be applied for instance to the cross section 906. Curve 952 shows that the weight multiplier takes a value of 1 outside the blur regions and drops linear across both blur regions until it reaches zero at the actual segment boundary.

The above techniques for adjusting the filter weights near segment boundaries may similarly be applied to the next future frame. With this addition of weight multipliers as described above, the formula for the color value returned by the temporal filter (taking the Y value as an example) now becomes:

$$y' = \frac{k_p w_p y_p + y_c + k_f w_f y_f}{k_p w_p + 1 + k_f w_f}.$$

3.3 Smoothing Over GOP Boundaries

The process described so far works well when applied to a video sequence that has been compressed and then decompressed by a decoder using object motion information since the motion information accessed by the decoder can also be used to create a motion field that is then used to align pixels that should be averaged. However, compressed video sequences are typically divided into GOPs, or groups of pictures, where each GOP contains predicted frames that are coded with reference to one keyframe. The keyframe, or 'I-frame' where 'I' stands for intra-coded, is coded independently of other frames. At the boundary between GOPs, typically no motion information is encoded linking the earlier GOP to the later GOP since each GOP is encoded relative to its own keyframe. Thus, an additional object motion estimation step should be performed to determined motion vectors across GOP boundaries. This step may for instance mirror the motion estimation an encoder already performs while encoding predicted frames from the video sequence.

Figure 10:
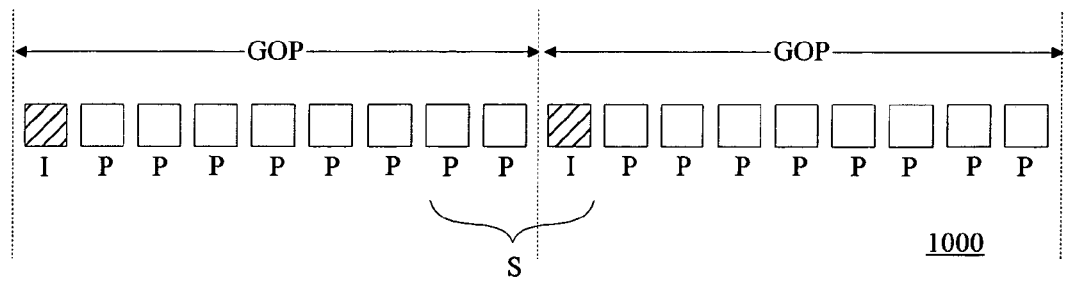
FIG. 10 is an illustration of blending across GOP boundaries.
Figure 10:
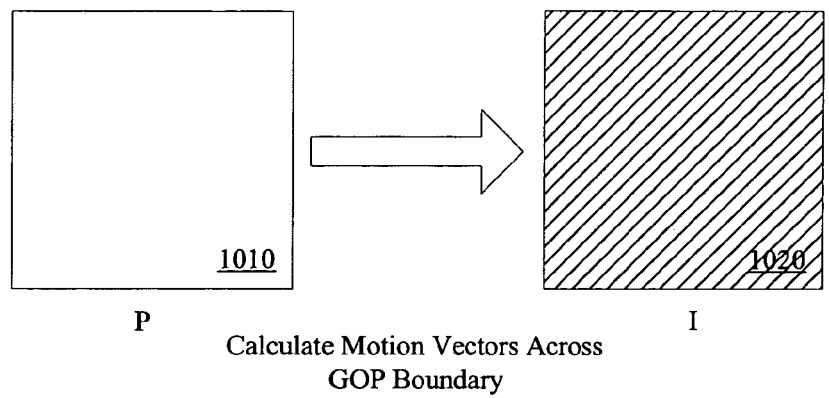

FIG. 10 illustrates the application of the temporal filter across a GOP boundary in one embodiment. Sequence 1000 shows two consecutive GOPs from a video sequence that has been compressed and then decompressed. In this example each GOP begins with an I-frame and contains several predicted frames or 'P-frames.' In general, a GOP may also contain bi-directionally predicted frames, or 'B-frames.' Set S contains the last two P-frames from the first GOP and the I-frame from the second GOP. When the temporal filter is applied to the last P-frame in the first GOP, information from the frames in set S should be used. The additional step is used to calculate object motion vectors across the GOP boundary, between the depicted frames 1010 and 1020. These motion vectors are then used to align pixels between the frames so that the temporal filter can be applied. Preferably, the calculation of motion vectors across the GOP boundary should be performed by the encoder which has access to the raw frames.

As mentioned before, in the special case where the GOP boundary occurs at a scene change, then no filtering should occur across the boundary. In this case, the support of the temporal filter is restricted to lie only within the GOP of the current frame.

3.4 Lighting Offset

Another potential artifact can arise in large smooth areas containing exposed areas when the lighting changes. Take for instance a relatively flat area that is gradually becoming brighter from frame n−1 to frame n+1 and in which an exposed area appears in frame n. The exposed area has no match in frame n−1, so it is only averaged with pixels from frame n+1, making it brighter. However, the surrounding non-exposed area will be averaged with pixels from both frame n−1 and frame n+1, so its lighting will not change. As a result, the averaging process will create a perceptible difference between the exposed area and the non-exposed area.

The temporal filtering process can be tuned to avoid such artifacts arising due to lighting changes. It can first calculate a low-pass filtered estimate of the lighting for each segment or region in the current frame and for the matching segments or regions in the past (or future) frame. The same low-pass filter is used to calculate the lighting for the current and past (or future) frames. The difference between the lighting of a segment in the past (or future) and current frame is calculated to determine a lighting offset. The lighting offset is then used to correct for changes in lighting between the frames before performing the temporal average.

Figure 11:
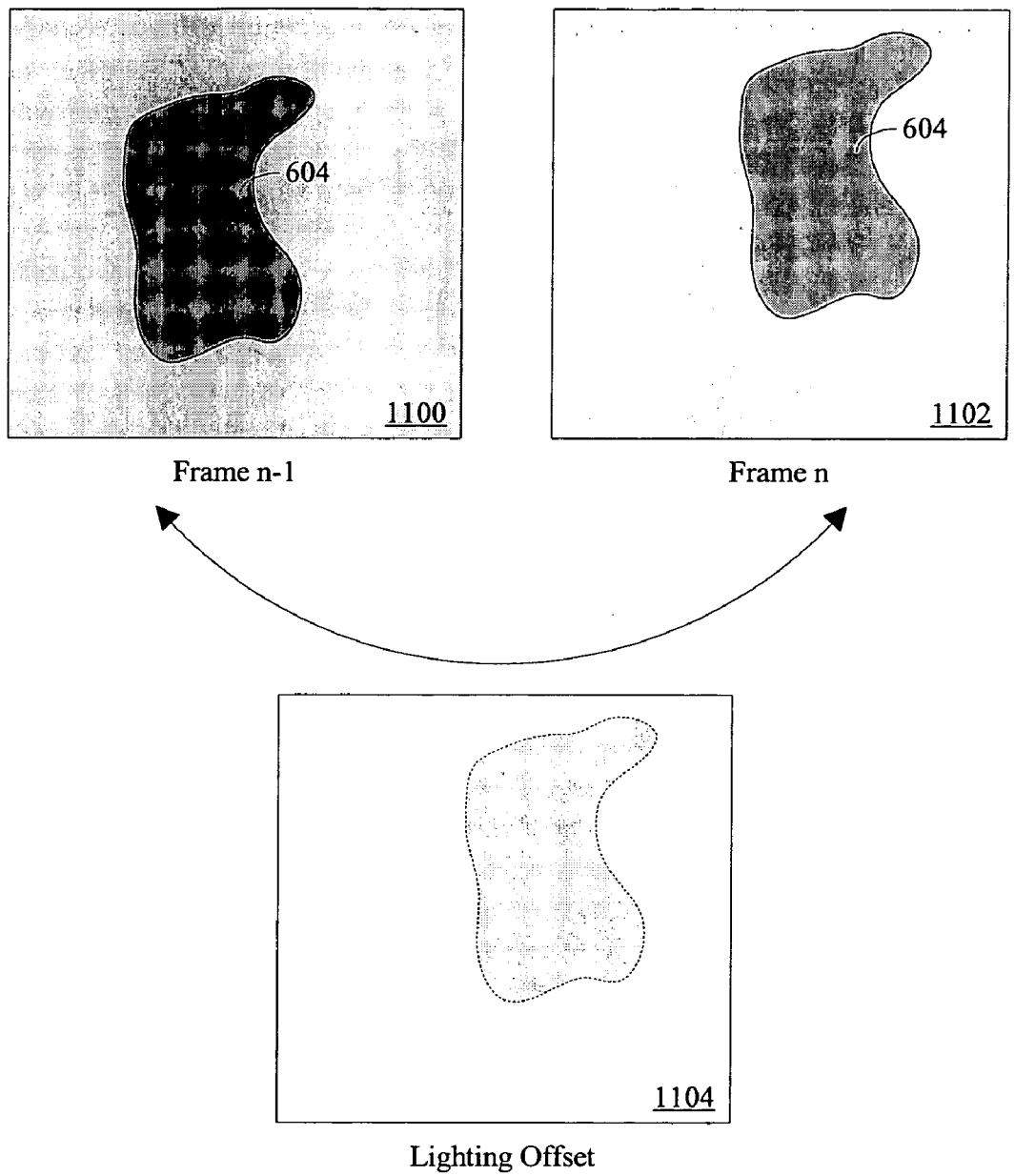
FIG. 11 is an illustration of a lighting offset between two segmented frames of a video sequence.

FIG. 11 illustrates a lighting offset for a segment 604 that appears in consecutive frames 1100 and 1102. The pixels surrounding segment 604 and the segment itself get brighter between frame 1100 and frame 1102. When the average colors for segment 604 in the two frames are subtracted, the lighting offset shown in frame 1104 results.

Note that all segments in a neighborhood of a given segment may be used in computing the low-pass filtered measure of lighting for the region. Computing lighting on a segment-by-segment basis, using average color values for each segment, is much more efficient than attempting to calculate lighting changes for each pixel independently.

3.5 Temporal Filtering Apparatus

Figure 12:
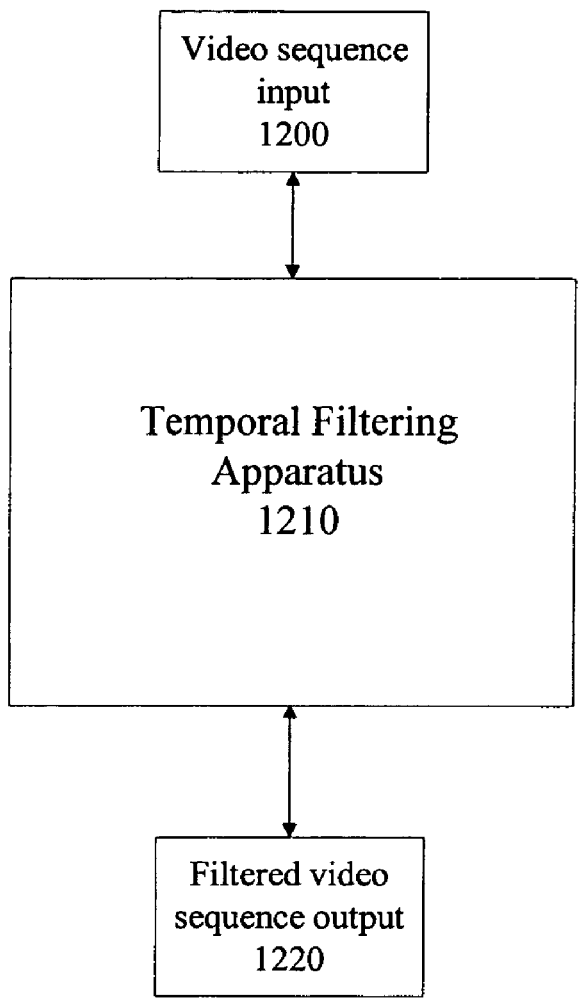
FIG. 12 is an illustration of an apparatus for temporally filtering video sequences according to the process disclosed herein.

FIG. 12 illustrates at a high level an apparatus used to perform the temporal filtering process disclosed herein. A video sequence 1200 is input into a temporal filtering apparatus 1210. The temporal filtering apparatus 1210 averages consecutive frames from the sequence according to the rules discussed above to produce a new filtered video sequence 1220. This filtered video sequence 1220 is provided as output.

The input 1200 may be a raw video sequence or it may be a sequence that has been compressed and decompressed or subjected to other video processing. It may for instance be a sequence that has been encoded and decoded according to the teachings of Prakash I. The output 1220 may be viewed by a viewer or it may be subjected to compression or other subsequent video processing.

The temporal filtering apparatus 1220 may for instance be realized as a set of instructions for a computer processor, such as for example the processor in a personal computer (PC). The temporal filtering apparatus 1220 may also be realized for example as a hardware device, comprising a system on a chip (SoC) or as one component of an SoC.

4 Conclusions, Ramifications, and Scope

The disclosed method and apparatus for temporally filtering a digital video sequence provide a significant advance in the art. The filtering process uses actual object motion information to greatly increase the accuracy of its motion compensation over the existing art. It further provides new techniques for adapting the filter's support and weights to eliminate artifacts that arise because of color blur across boundaries and lighting changes between frames. The method and apparatus are particularly suited for post-processing of video that has been compressed and decompressed, but they can also be applied in other contexts to remove random noise and other artifacts from a video sequence.

Reference throughout this specification to "one embodiment" or "an embodiment" or the like means that a particular feature, structure, or characteristic described in connection with the embodiment is included in at least one embodiment of the present invention. Thus, the appearances of the phrases "in one embodiment" or "in an embodiment" or the like in various places throughout this specification are not necessarily all referring to the same embodiment. Furthermore, the particular features, structures, or characteristics may be combined in any suitable manner in one or more embodiments.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for temporally filtering a video sequence, the method comprising:
    using object motion estimation for arbitrarily shaped segments to align corresponding pixels between at least two frames by a temporal filtering apparatus;
    determining segments that are no longer adjacent to a segment boundary based on said object motion estimation by the temporal filtering apparatus;
    reducing impact of color blur from said segments that are no longer adjacent by adjusting weights assigned to one or more frames for pixels that lie within a blur region near said segment boundary by the temporal filtering apparatus;
    setting the weight for one or more past frames to zero for pixels that lie within a newly exposed area; and
    computing a weighted average of color values of said corresponding pixels by the temporal filtering apparatus.

2. The method of claim 1, further comprising:
    determining additional motion information across GOP boundaries to allow filtering across these boundaries.

3. The method of claim 1, further comprising:
    calculating a lighting offset which expresses a difference in lighting for a segment between two frames; and using said lighting offset to correct lighting discrepancies caused by averaging pixels from frames with different lighting.

4. An apparatus for temporally filtering a video sequence, wherein object motion estimation for arbitrarily shaped segments is used to align corresponding pixels between at least two frames and to determine segments that are no longer adjacent to a segment boundary, wherein weights assigned to one or more frames are adjusted for pixels that lie within a blur region near said segment boundary to reduce impact of color blur from said segments that are no longer adjacent to said segment boundary, wherein a weight for one or more past frames is set to zero for pixels that lie within a newly exposed area, and wherein said apparatus computes a weighted average of color values of said corresponding pixels.

5. A method for temporally filtering a video sequence using motion compensation, the method being performed by a temporal filtering apparatus and comprising:
    estimating motion of objects between frames in the video sequence;
    aligning pixels from a current frame with matching pixels from select neighboring frames according to the estimated motion of a surrounding object;
    calculating a weighted average of the aligned pixels for each pixel in the current frame to produce a filtered version of the current frame; adjusting weights used to calculate the weighted average in order to compensate for blur transitions near object boundaries due to temporal changes in adjacent objects; and
    setting a weight for one or more past frames to zero for pixels that lie within a newly exposed area.

6. The method of claim 5, wherein the adjustment of weights comprises a reduction of a weight multiplier in a blur region near an exposed area.

7. The method of claim 5, wherein the adjustment of weights comprises a reduction of a weight multiplier in a blur region between converging objects.

8. The method of claim 5, wherein the estimation of motion is between frames that are across a group of pictures (GOP) type boundary which does not involve a scene change.

9. The method of claim 5, further comprising:
    calculating a lighting offset; and
    applying the lighting offset prior to calculating the weighted average in order to compensate for lighting shifts.

* * * * *

UNITED STATES PATENT AND TRADEMARK OFFICE
CERTIFICATE OF CORRECTION

PATENT NO. : 7,639,741 B1
APPLICATION NO. : 10/729834
DATED : December 29, 2009
INVENTOR(S) : Holt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1330 days.

Signed and Sealed this

Ninth Day of November, 2010

David J. Kappos
*Director of the United States Patent and Trademark Office*